United States Patent [19]
Jahrling

[11] Patent Number: 6,161,814
[45] Date of Patent: *Dec. 19, 2000

[54] INFRARED DETECTOR WITH BEAM PATH ADJUSTMENT

[75] Inventor: Peter J. Jahrling, Park Ridge, Ill.

[73] Assignee: Sloan Valve Company, Franklin Park, Ill.

[*] Notice: This patent is subject to a terminal disclaimer.

[21] Appl. No.: 09/271,834

[22] Filed: Mar. 18, 1999

Related U.S. Application Data

[63] Continuation of application No. 08/500,033, Jul. 10, 1995, Pat. No. 5,950,983, which is a continuation of application No. 08/109,970, Aug. 23, 1993, abandoned.

[51] Int. Cl.[7] .................................................. F16K 31/02
[52] U.S. Cl. .......................... 251/129.04; 4/313; 4/623; 4/DIG. 3; 250/221
[58] Field of Search ................................... 4/DIG. 3, 313, 4/623; 251/129.04; 250/221, 559.3, 559.4

[56] References Cited

U.S. PATENT DOCUMENTS

| | | | |
|---|---|---|---|
| 4,069,812 | 1/1978 | O'Neill | 126/271 |
| 4,703,171 | 10/1987 | Kahl et al. | 250/221 |
| 5,169,118 | 12/1992 | Whiteside | 4/623 X |

*Primary Examiner*—Charles E. Phillips
*Attorney, Agent, or Firm*—McEachran, Jambor, Keating, Bock & Kurtz

[57] ABSTRACT

An electrical control system for operating a toilet flushing device includes an electric operator, a source of power for the operator and a detection system for detecting the presence of a user of a toilet device and upon detection thereof connecting the source of power to the electric operator. The detection system includes an infrared transmitter and an adjacent infrared receiver, with the receiver being sensitive to infrared radiation reflected from a toilet device user. There is a refracting element positioned in front of the transmitter and receiver to bend the transmitted infrared radiation beam to a desired angle relative to the initial direction of the transmitted beam and to bend a reflected beam from a toilet device user to a direction wherein it is generally parallel to the initial transmitted beam.

24 Claims, 2 Drawing Sheets

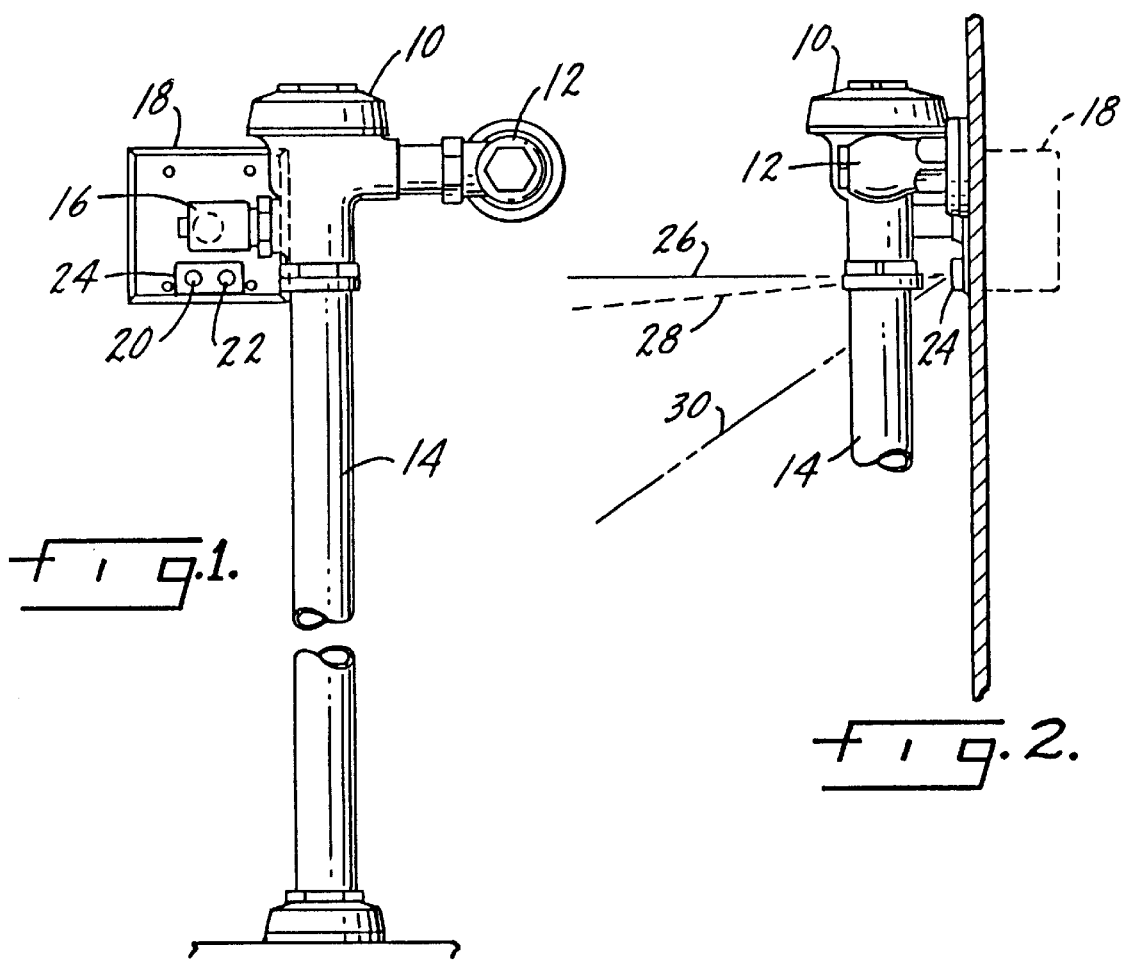

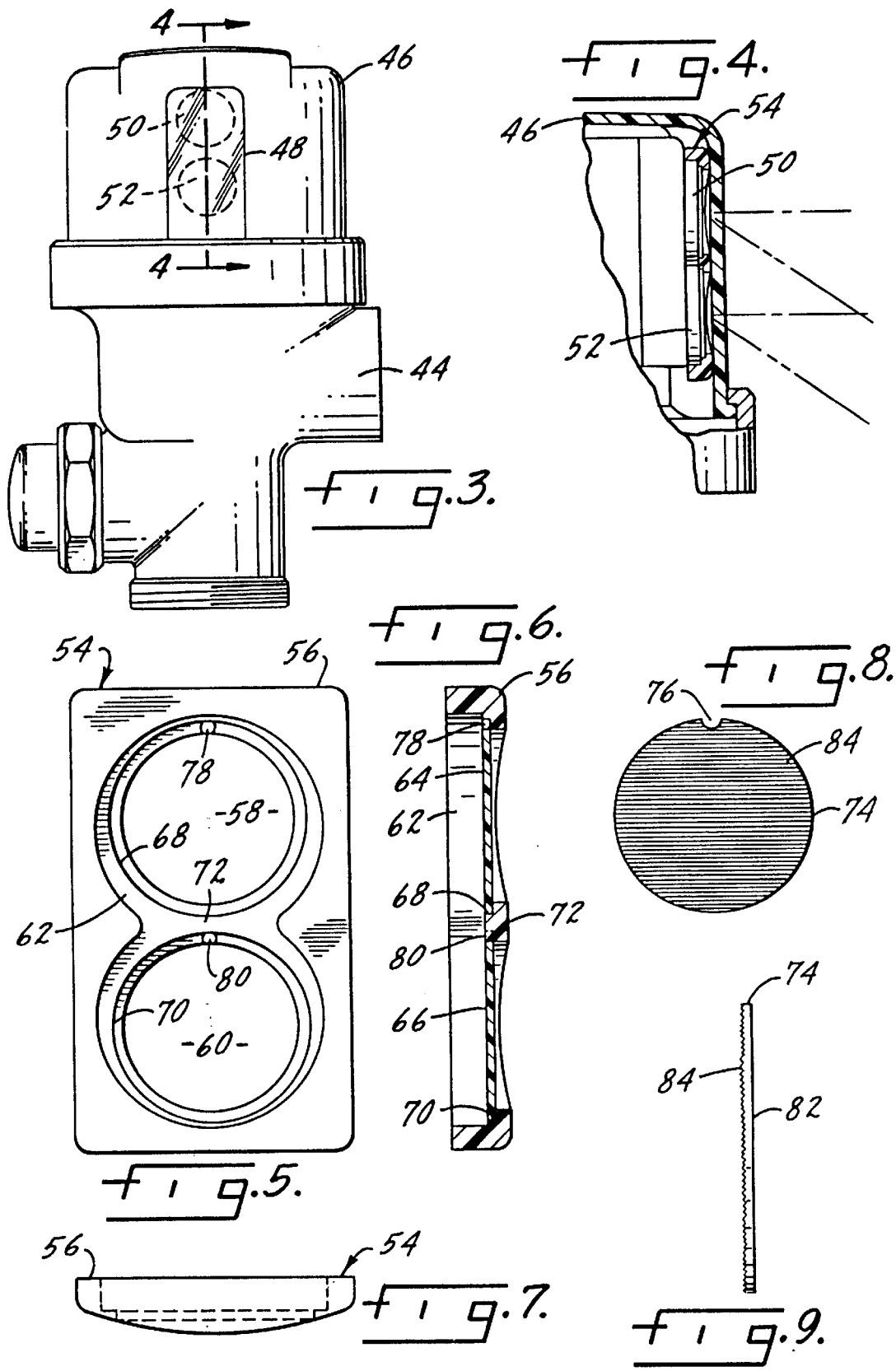

INFRARED DETECTOR WITH BEAM PATH ADJUSTMENT

This application is a continuation of application Ser. No. 08/500,033, filed Jul. 10, 1995, now U.S. Pat. No. 5,950,983, which is a file wrapper continuation of application Ser. No. 08/109,970, filed Aug. 23, 1993 now abn.

THE FIELD OF THE INVENTION

It is common in public washrooms to utilize detectors for automatically operating flush valves for urinals and water closets, faucets, hand dryers, soap dispensers, and other electrically operated devices commonly found in such areas. The use of such automatic devices is particularly necessary for the flushing of urinals and water closets, as there is a tendency for users of such to refrain from manually initiating a flushing operation. It is desirable to have electrical controls for faucets so as to control the use of water. Sloan Valve Company of Franklin Park, Ill., the assignee of the present application, sells an infrared detection system for operating all of the above toilet room devices under the trademark OPTIMA. This detection system transmits an infrared beam in a desired direction and when the beam is reflected from a user of the device back to the receiver, power is applied to operate the device.

Particularly in the electric flushing devices for water closets, the installation thereof is simplified if the detection system can be placed closely adjacent the electric operator. This eliminates the necessity to have two electrical junction boxes and the consequent additional conduit and wiring between the boxes. However, in those instances in which the flushing device, which includes a vacuum breaker, must be located a predetermined distance above the water closet, it has been found that if the detector is located the same height above the water closet, the transmitted infrared beam will miss an individual seated upon the water closet with the result that both the individual and maintenance personnel consider the detection system to be inoperative. In fact, the detection system may be functioning normally; it is simply that the infrared beam has not been directed to the proper area.

The present invention addresses this problem by utilizing a thin film which refracts or bends or alters direction of the transmitted and reflected beams to a desired area. The beam altering techniques disclosed may be used on a variety of toilet room devices. The invention may utilize a thin transparent film sold by 3M Company under the designation "Lensfilm". The film is thin, transparent, and made up of a plurality of generally parallel adjacent prisms. Based on information provided by 3M, "Lensfilm" is made of a polymethyl methacrylate blend. It has a weatherable acrylic substrate bearing the designation KSHMS-983. The "Lensfilm" has a thickness of 0.06 centimeter and in the present invention is positioned directly adjacent the infrared transmitter and receiver. The invention should not be limited to the use of this particular film, as others may be equally satisfactory.

SUMMARY OF THE INVENTION

The present invention relates to electrical control systems for operating toilet room devices and particularly to improvements in infrared detectors for such use.

A primary purpose of the invention is an optical control system which includes means for altering the transmitted and reflected electromagnetic radiation to a desired angle relative to the initial transmitted beam so as to direct the transmitted beam to a desired area relative to the user of the device.

Another purpose is an infrared detection system utilizing a thin transparent refracting medium having a plurality of generally parallel prisms as a means for bending an infrared beam to a desired angle.

Another purpose of the invention is to provide an infrared detection system for use in sensing the presence of a user of a toilet room device which utilizes a refracting transparent film in front of the transmitter and/or receiver to bend the transmitted and reflected beams through a desired angle.

Another purpose is an infrared detection system which may be used with any toilet room device such as a urinal, water closet, hand dryer, soap dispenser or faucet.

Another purpose is a refracting medium for use with an infrared detection system which may be either active or passive.

Another purpose is to provide a means for altering the direction of an infrared sensor beam which may be either focused or non-focused.

Other purposes will appear in the ensuing specification, drawings and claims.

BRIEF DESCRIPTION OF THE DRAWINGS

The invention is illustrated diagrammatically in the following drawings wherein:

FIG. 1 is a front view of a typical sensor-operated flush valve installation for a water closet;

FIG. 2 is a partial side view of the flush valve installation of FIG. 1;

FIG. 3 is a front view of a battery powered flush valve;

FIG. 4 is a partial enlarged side view taken along plane 4—4 of FIG. 3 illustrating the infrared transmitter and receiver;

FIG. 5 is a front view of the beam refracting element used in FIG. 4;

FIG. 6 is a side view of the beam refracting element of FIG. 5;

FIG. 7 is a top view of the beam refracting element of FIGS. 5 and 6;

FIG. 8 is a front view of the transparent beam refracting film; and

FIG. 9 is a side view of the film of FIG. 8.

DESCRIPTION OF THE PREFERRED EMBODIMENT

U.S. Pat. No. 4,309,781 owned by Sloan Valve Company, the assignee of the present application, discloses an infrared operated automatic flushing system in which the presence of a user of the toilet device detected by an infrared sensor causes operation of the flush valve to start the flushing cycle. This system is sold by Sloan Valve Company under the trademark OPTIMA and the infrared sensing system is usable with urinals, water closets, faucets, soap dispensers, and hand dryers. U.S. Pat. No. 5,169,118 also owned by Sloan Valve Company discloses a sensor-operated battery powered flush valve and the subject matter of this patent is incorporated by reference in the present application.

In the '118 patent the flush valve operator, which is an electrically powered solenoid, the infrared sensor transmitter and receiver, batteries for powering the sensor and the solenoid all are located on top of the flush valve within a specially designed cover. The infrared transmitter has a focusing lens which is used to concentrate the transmitted infrared beam on a desired zone and there is a similar focusing lens on the receiver which is designed to sense reflected beams from the same zone.

It has been determined that in some installations, particularly where the flush valve must be located at least 24" above the water closet to meet code requirements for vacuum breakers that the infrared transmitted beam will often be above a person seated upon the water closet with the result that the flush valve will not operate which is viewed both by the individual using the toilet device and maintenance personnel as indicating an inoperative flush valve. This is not correct and in fact the flush valve did not operate because the sensor beam did not detect the individual using the water closet.

The present invention is directed to overcoming this problem by refracting, bending, or altering direction of the transmitted beam toward a specific zone or area to insure detection of the individual using the water closet. The principles described, i.e., bending the transmitted infrared beam by the use of a transparent refracting medium, is equally applicable when sensor-operated flushing devices are used on urinals. Similarly, the principles are applicable to any toilet room device such as a hand dryer, faucet, soap dispenser or the like, in which infrared sensing is the medium used to detect the presence of a user and to initiate the operation of the device whether it be starting a hand dryer, operating a soap dispenser, operating a faucet, or flushing a urinal or water closet. The principles disclosed herein permit adjusting the path of the transmitted infrared beam to a desired angle consistent with the application and this angle may be in any plane relative to the sensor. For example, the beam may be bent down, as will be described in the case of a water closet. It may be bent to either side or in some installations the beam may be bent upward. In each case the beam refracting medium will function equally on the reflected infrared beam, i.e. the beam reflected by the user or some object which is in the zone of detection. The transparent refracting medium will work equally on the transmitted and reflected or received beam so that these beams will be essentially normal to the transmitter and receiver after passing through the refracting medium. Although the invention will be described in connection with an active detection system, it is equally useful with a passive system in which there is no transmitter of electromagnetic radiation, but only a receiver sensitive to radiation emitted from an adjacent person. The invention also will be described as having a refracting medium in front of both the transmitter and receiver. It is further within the scope of the invention to utilize a refracting medium in front of either the transmitter or receiver, but not necessarily both.

The refracting medium used in the preferred embodiment is marketed by 3M under the designation "Lensfilm" and is made from a polymethyl methacrylate blend on a substrate of weatherable acrylic. The film thickness is approximately 0.06 centimeter and is made up of a plurality of very small parallel prisms which have the effect of bending the beam when it passes from the grooved or prism side of the transparent film through the plain side. The particular disposition, size, and shape of the prisms will determine the degree to which bending takes place. Similarly, by the orientation of the parallel prisms, the direction of bending can be varied. U.S. Pat. No. 4,069,812 owned by 3M Company references the specific material. The invention, however, should not be limited to this particular transparent film as others may be equally satisfactory.

In FIG. 1 a typical flush valve of the type sold by Sloan Valve Company under the trademark ROYAL is indicated at 10 and when included with an infrared detector the system is sold under the trademark OPTIMA. The flush valve receives a water supply through a connection 12 and will discharge water through a pipe 14. The flush valve 10 includes a vacuum breaker and in many installations it is required that the vacuum breaker be at least 24" above the water closet. The solenoid which operates the flush valve is indicated at 16 and the junction box housing the infrared sensor and related electrical devices is indicated at 18. Conventional AC power is supplied for operation. The infrared transmitter and receiver are indicated at 20 and 22 and are located in a detector box 24 adjacent the bottom of junction box 18. This is more clearly illustrated in FIG. 2. In normal operation the transmitter will send an infrared beam and if such is reflected by a user of the toilet device, the reflected beam will be received at the receiver, and will institute a flushing cycle culminating in the operation of the solenoid to cause the flush valve to pass a measured amount of water to the water closet.

Typically, and as particularly described in U.S. Pat. No. 4,309,781, the infrared sensor and receiver have focusing lenses on the face thereof which concentrate the transmitted beam along a centerline 28 which is at an angle of five degrees down from a horizontal plane represented by line 26. The present invention by the use of a transparent refracting film positioned within detector box 24 in front of the transmitter and receiver will bend the transmitted infrared beam approximately 30 degrees to a centerline indicated by the broken line 30. The refracting film not only alters direction, but alters the geometry of the beam hot spot from a round pattern to a relatively oval pattern, with the major axis of the pattern being in a horizontal plane. The invention should not be limited to the particular angle described, although the commercially made "Lensfilm" provides this angle and it is found to be satisfactory for the intended purpose.

FIG. 3 illustrates a battery powered infrared sensor operated flush valve of the type specifically described in U.S. Pat. No. 5,169,118. The flush valve body is indicated at 44 and supports a transparent or translucent cover 46. The infrared sensor window is indicated at 48 and behind this window there are vertically aligned an infrared receiver 50 and an infrared transmitter 52. Both may have focusing lenses. Within the cover 46, again as illustrated in the '118 patent, there is a solenoid which functions to open a passage to relieve pressure above the flush valve diaphragm to permit full flow through the valve. There are a plurality of batteries which provide power to operate the solenoid when an infrared beam is reflected from an object, such as a toilet device user, back to the receiver. The receipt of the reflected beam causes electrical circuitry associated with the batteries to connect the batteries to the solenoid to operate the flush valve.

As illustrated in FIG. 4, there is a beam refracting means indicated generally by the number 54 and which is illustrated in more detail in FIGS. 6–9. The beam refracting means will bend the transmitted beam a desired angle from a line normal to the transmitter. The desired angle may be in addition to any beam alteration from a focusing lens if such is used. The refracting medium bends a received reflected beam in the same way.

The refracting element 54, as particularly shown in FIGS. 5, 6, and 7, includes a housing 56, which may be plastic, rubber, or synthetic rubber, having a receiver opening 58 and a transmitter opening 60. There is a recess at the rear of housing 56, indicated at 62, so that the housing may fit over the combined transmitter and receiver positioned within the cover 46. There are separate refracting elements in housing 56. The receiver refracting element is indicated at 64 and the transmitter refracting element is indicated at 66. These elements fit tightly within additional recesses 68 and 70, respectively, which adjoin the large recess 62. Each of the refracting mediums 64 and 66 will be visible through the openings 58 and 60.

Positioned between the refracting mediums is a housing portion indicated at 72 which in effect forms a barrier between the transmitter and receiver, preventing stray reflections from the transmitting refracting medium 66 from being reflected directly back to the receiver. This barrier has been found to be necessary to also prevent direct reflections of infrared beams passing through the cover 46 from being reflected back to the receiver 50. Because of the nature of the refracting element it is possible for some radiation to be transmitted from its edge. By placing the refracting film tightly within a recess or pocket, such stray and undesired radiation is effectively removed or prevented from causing an accidental operation of the flush valve. This is prevented by the barrier 70 between the receiver and transmitter refracting elements.

The refracting element itself is indicated specifically in FIGS. 8 and 9 and designated by the number 74. There is a notch 76 which cooperates with projections 78 and 80 in the housing 56 to properly orient the refracting mediums. Again, the location of the projections 78 and 80 will vary depending upon the direction to which the transmitted and received beams are to be altered. FIG. 9 illustrates a side view of the refracting medium. The rear side, or that facing the transmitter or receiver, is indicated at 84 and is formed by a plurality of generally parallel refracting prisms, one of which is indicated at 83. The front side is indicated at 82 (faces out toward cover 46) and is flat or planar. The result from using side by side refracting prisms is that an infrared beam passing from the grooved side through the flat side will be bent approximately 30 degrees away from a line normal to the face of the film. The angle can be varied, depending upon the form of the prism. Greater or lesser angles are possible with a change in the shape of each of the prisms forming the face 84.

Of importance in the invention is the ability to alter, redirect, or bend by refraction a beam of electromagnetic radiation, such as infrared. This provides a means for directing a sensing beam of electromagnetic radiation to a particular zone so that an object within that zone can be detected. The ability to bend makes it possible to direct the beam to any desired location without going through the very substantial expense of making specific focusing lenses for the transmitter and receiver. By using a refracting medium the beam can be bent far more economically than through the use of lenses.

Whereas the preferred form of the invention has been shown and described herein, it should be realized that there may be many modifications, substitutions and alterations thereto.

The embodiments of the invention in which an exclusive property or privilege is claimed are defined as follows:

1. An infrared detection system for use in sensing the presence of a user of a toilet room device including an infrared transmitter for sending a beam of electromagnetic radiation in the infrared spectrum, a receiver responsive to infrared radiation reflected from an object in the path of said transmitted radiation, and refracting means located in front of and adjacent the transmitter and receiver for bending the transmitted beam to a desired angle relative to the initial direction of the transmitted beam, said refracting means bending a reflected beam traveling along the desired angle so that the reflected beam, after refraction, is generally parallel to the transmitted beam.

2. The detection system of claim 1 further characterized in that said refracting means includes means for preventing the transmitted beam from being reflected directly back to the receiver.

3. The detection system of claim 1 further characterized in that said refracting means includes a housing, a thin film having a plurality of adjacent prisms being positioned in said housing and located in front of said transmitter and receiver.

4. The detection system of claim 3 further characterized in that said housing mounts a thin film having a plurality of adjacent prisms in front of said transmitter and a thin film having a plurality of adjacent prisms in front of said receiver, said housing including means separating said thin films.

5. The detection system of claim 4 further characterized in that said adjacent prisms are generally parallel.

6. The detection system of claim 3 further characterized in that said film is formed of a polymethyl methacrylate blend.

7. The detection system of claim 1 further characterized by and including a focusing lens positioned between said transmitter and said refracting means and a focusing lens positioned between said receiver and refracting means.

8. An electrical control system for operating a toilet flushing device including a toilet flushing device electric operator, a source of power therefor, a detection system for detecting the presence of a user of a toilet device and upon detection thereof connecting the source of power to the electric operator, said detection system including a receiver sensitive to electromagnetic radiation from the toilet device user, and refracting means positioned in front of said receiver for bending the electromagnetic radiation from the toilet device user to a direction wherein it is generally normal to said receiver.

9. The electrical control system of claim 8 further characterized by and including a transmitter of electromagnetic radiation located adjacent to said receiver, said receiver being sensitive to electromagnetic radiation reflected from a toilet device user.

10. The electrical control system of claim 9 further characterized in that said refracting means is positioned in front of said transmitter and receiver and bends the transmitted electromagnetic radiation to a desired angle and bends the reflected electromagnetic radiation through the same angle so that the reflected radiation is generally parallel to said transmitted radiation.

11. An electrical control system for operating a toilet flushing device including a toilet flushing device electric operator, a source of power therefor, a detection system for detecting the presence of a user of a toilet device and upon detection thereof connecting the source of power to the electric operator, said detection system including an infrared transmitter and an adjacent infrared receiver, said receiver being sensitive to infrared radiation reflected from a toilet device user, refracting means positioned in front of said transmitter and receiver to bend the transmitted infrared beam to a desired angle relative to the initial direction of the transmitted beam and to bend a reflected beam from a toilet device user to a direction wherein it is generally parallel to the initial direction of the transmitted beam.

12. The control system of claim 11 further characterized in that said source of power is at least one battery mounted adjacent to said electric operator.

13. The control system of claim 11 further characterized in that said source of power is commercially available electric power.

14. The control system of claim 11 further characterized in that said refracting means includes a thin transparent film having a plurality of generally parallel adjacent prisms, said film being positioned adjacent and located in front of said transmitter and receiver.

15. The control system of claim 14 further characterized in that there is a separate transparent film with parallel prisms in front of said receiver and a separate film with parallel prisms in front of said transmitter.

16. The control system of claim 15 further characterized by and including means separating said separate transparent films.

17. The control system of claim 11 further characterized in that said refracting means includes a housing, and a transparent film having a plurality of generally parallel prisms positioned in said housing in front of said transmitter, a transparent film having a plurality of generally parallel prisms positioned in said housing and in front of said receiver.

18. The control system of claim 17 further characterized in that said housing includes a recess, each of said films being positioned within said recess.

19. The control system of claim 18 further characterized in that said housing includes a portion thereof separating said transparent films to prevent reflection of a transmitted infrared beam from being reflected directly back to said receiver.

20. The control system of claim 11 further characterized in that the toilet flushing device operates a urinal.

21. The control system of claim 11 further characterized in that said toilet flushing device operates a water closet.

22. The control system of claim 11 further characterized by and including a cover enclosing said electric operator, source of power and detection system, said cover permitting the passage of infrared radiation, said refracting means being located inside of said cover.

23. An infrared detection system for use in sensing the presence of a user of a toilet room device including an infrared transmitter for sending a beam of electromagnetic radiation in the infrared spectrum, a receiver responsive to infrared radiation reflected from an object in the path of said transmitted radiation, and refracting means located in front of the transmitter for bending the transmitted beam to a desired angle relative to the initial direction of the transmitted beam.

24. The infrared detection system of claim 23 further characterized by and including refracting means located in front of the receiver for bending a reflected beam traveling along the desired angle so that the reflected beam, after refraction, is generally parallel to the transmitted beam.

* * * * *